US008219936B2

(12) United States Patent
Kim et al.

(10) Patent No.: US 8,219,936 B2
(45) Date of Patent: Jul. 10, 2012

(54) USER INTERFACE FOR A MOBILE DEVICE USING A USER'S GESTURE IN THE PROXIMITY OF AN ELECTRONIC DEVICE

(75) Inventors: Joo Min Kim, Seoul (KR); Deok Hwa Jung, Seoul (KR); Man Ho Lee, Seoul (KR); Young Hwan Kim, Seoul (KR); Ki Hyun Kim, Seoul (KR); Dong Soo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 778 days.

(21) Appl. No.: 12/196,104

(22) Filed: Aug. 21, 2008

(65) Prior Publication Data
US 2009/0265670 A1    Oct. 22, 2009

Related U.S. Application Data

(60) Provisional application No. 61/025,320, filed on Feb. 1, 2008.

(30) Foreign Application Priority Data

| Aug. 30, 2007 | (KR) | 10-2007-0087828 |
| Dec. 28, 2007 | (KR) | 10-2007-0140436 |
| Dec. 28, 2007 | (KR) | 10-2007-0140438 |
| May 7, 2008 | (KR) | 10-2008-0042144 |
| Jul. 15, 2008 | (KR) | 10-2008-0068755 |

(51) Int. Cl.
G06F 3/048    (2006.01)
(52) U.S. Cl. ........ 715/862; 715/863; 715/705; 715/708; 715/711; 715/715
(58) Field of Classification Search .................. 715/863, 715/862, 859, 705, 708, 711, 715
See application file for complete search history.

(56) References Cited

U.S. PATENT DOCUMENTS

| 4,698,625 | A | * | 10/1987 | McCaskill et al. | 345/157 |
| 5,119,079 | A | * | 6/1992 | Hube et al. | 715/823 |
| 5,347,295 | A | * | 9/1994 | Agulnick et al. | 345/156 |
| 5,579,037 | A | * | 11/1996 | Tahara et al. | 345/173 |
| 5,736,974 | A | * | 4/1998 | Selker | 715/862 |
| 5,754,873 | A | * | 5/1998 | Nolan | 715/235 |
| 5,757,358 | A | * | 5/1998 | Osga | 715/862 |
| 5,805,165 | A | * | 9/1998 | Thorne et al. | 715/823 |
| 5,986,639 | A | * | 11/1999 | Ozawa et al. | 715/856 |

(Continued)

FOREIGN PATENT DOCUMENTS
EP    0516228 A2    12/1992
(Continued)

Primary Examiner — Weilun Lo
Assistant Examiner — Rashedul Hassan
(74) Attorney, Agent, or Firm — Birch, Stewart, Kolasch & Birch, LLP

(57) ABSTRACT

An electronic device having a user interface on a display and method for controlling the device, the method including: detecting a proximity of an object to the display; detecting a two-dimensional motion pattern of the object; and controlling the user interface according to the detected two-dimensional motion pattern. Also, a method including: detecting an object in a space over a border between first and second zones of a plurality of touch-sensitive zones and outputting a detection signal; and simultaneously displaying first and second information elements corresponding to the first and second zones in response to the detection signal.

6 Claims, 20 Drawing Sheets

U.S. PATENT DOCUMENTS

| | | | |
|---|---|---|---|
| 6,049,326 A * | 4/2000 | Beyda et al. | 345/157 |
| 6,323,846 B1 | 11/2001 | Westerman et al. | |
| 6,429,846 B2 | 8/2002 | Rosenberg et al. | |
| 6,717,600 B2 * | 4/2004 | Dutta et al. | 715/862 |
| 6,874,126 B1 * | 3/2005 | Lapidous | 715/711 |
| 6,992,702 B1 * | 1/2006 | Foote et al. | 348/211.8 |
| 7,030,861 B1 | 4/2006 | Westerman et al. | |
| 7,038,659 B2 | 5/2006 | Rajkowski | |
| 7,084,859 B1 | 8/2006 | Pryor | |
| 7,091,886 B2 | 8/2006 | DePue et al. | |
| 7,180,501 B2 | 2/2007 | Marvit et al. | |
| 7,180,502 B2 | 2/2007 | Marvit et al. | |
| 7,301,526 B2 | 11/2007 | Marvit et al. | |
| 7,482,943 B2 | 1/2009 | Beuk et al. | |
| 7,653,883 B2 | 1/2010 | Hotelling et al. | |
| 2001/0000663 A1 | 5/2001 | Shahoian et al. | |
| 2001/0026264 A1 | 10/2001 | Rosenberg | |
| 2001/0035854 A1 | 11/2001 | Rosenberg et al. | |
| 2002/0008691 A1 | 1/2002 | Hanajima et al. | |
| 2002/0015024 A1 | 2/2002 | Westerman et al. | |
| 2005/0003851 A1 * | 1/2005 | Chrysochoos et al. | 455/550.1 |
| 2005/0024325 A1 * | 2/2005 | Fleischmann et al. | 345/156 |
| 2005/0052425 A1 | 3/2005 | Zadesky et al. | |
| 2005/0071761 A1 * | 3/2005 | Kontio | 715/711 |
| 2005/0172734 A1 * | 8/2005 | Alsio et al. | 73/865.4 |
| 2005/0210417 A1 | 9/2005 | Marvit et al. | |
| 2005/0210418 A1 | 9/2005 | Marvit et al. | |
| 2005/0212749 A1 | 9/2005 | Marvit et al. | |
| 2005/0212750 A1 | 9/2005 | Marvit et al. | |
| 2006/0022955 A1 | 2/2006 | Kennedy | |
| 2006/0026521 A1 * | 2/2006 | Hotelling et al. | 715/702 |
| 2006/0066588 A1 * | 3/2006 | Lyon et al. | 345/173 |
| 2006/0192771 A1 | 8/2006 | Rosenberg et al. | |
| 2006/0232567 A1 | 10/2006 | Westerman et al. | |
| 2007/0070051 A1 | 3/2007 | Westerman et al. | |
| 2007/0211031 A1 * | 9/2007 | Marc | 345/163 |
| 2007/0242056 A1 * | 10/2007 | Engelhardt et al. | 345/173 |
| 2007/0262964 A1 * | 11/2007 | Zotov et al. | 345/173 |
| 2008/0046425 A1 * | 2/2008 | Perski | 707/6 |
| 2008/0134102 A1 * | 6/2008 | Movold et al. | 715/863 |
| 2008/0165141 A1 * | 7/2008 | Christie | 345/173 |
| 2008/0184173 A1 * | 7/2008 | Sutanto et al. | 715/863 |
| 2008/0238886 A1 * | 10/2008 | Bengtsson et al. | 345/177 |
| 2008/0246723 A1 * | 10/2008 | Baumbach | 345/156 |
| 2008/0278450 A1 * | 11/2008 | Lashina | 345/173 |
| 2008/0284738 A1 * | 11/2008 | Hovden et al. | 345/173 |
| 2008/0284739 A1 * | 11/2008 | Andrews et al. | 345/173 |
| 2008/0297471 A1 * | 12/2008 | Hill et al. | 345/156 |
| 2009/0079700 A1 * | 3/2009 | Abernathy | 345/173 |
| 2009/0225100 A1 * | 9/2009 | Lee et al. | 345/660 |
| 2009/0256947 A1 * | 10/2009 | Ciurea et al. | 348/333.12 |
| 2009/0284482 A1 * | 11/2009 | Chin | 345/173 |
| 2009/0327977 A1 * | 12/2009 | Bachfischer et al. | 715/863 |
| 2010/0026723 A1 * | 2/2010 | Nishihara et al. | 345/671 |
| 2010/0050134 A1 * | 2/2010 | Clarkson | 715/863 |
| 2010/0162182 A1 * | 6/2010 | Oh et al. | 715/863 |
| 2011/0041100 A1 * | 2/2011 | Boillot | 715/863 |

FOREIGN PATENT DOCUMENTS

| | | |
|---|---|---|
| KR | 10-282099 B1 | 2/2001 |
| KR | 10 2006 0059263 A | 6/2006 |
| KR | 10 2006 0069985 A | 6/2006 |
| KR | 10 2006 0134119 A | 12/2006 |
| KR | 10-2007-0036077 A | 4/2007 |
| KR | 10-2007-0119094 A | 12/2007 |
| WO | WO 2006/003586 A2 | 1/2006 |
| WO | WO 2006/003588 A2 | 1/2006 |
| WO | WO-2006/094308 A2 | 9/2006 |

* cited by examiner

USER INTERFACE FOR A MOBILE DEVICE USING A USER'S GESTURE IN THE PROXIMITY OF AN ELECTRONIC DEVICE

CROSS-REFERENCE TO RELATED APPLICATIONS

The present application claims priority under 35 U.S.C. 119 to U.S. Provisional Application No. 61/025,320 filed on Feb. 1, 2008, Korean Patent Application No. 10-2007-0087828 filed on Aug. 30, 2007; Korean Patent Application No. 10-2007-0140436 filed on Dec. 28, 2007; Korean Patent Application No. 10-2007-0140438 filed on Dec. 28, 2007; Korean Patent Application No. 10-2008-0042144 filed on May 7, 2008 and Korean Patent Application No. 10-2008-0068755 filed on Jul. 15, 2008, which are hereby incorporated by reference in its entirety.

BACKGROUND OF THE INVENTION

1. Field of the Invention

The present invention relates to a method for controlling a user interface, and more particularly to a method for controlling a user interface of an electronic device by detecting user's gesture in the proximity of a device.

2. Description of the Related Art

There exist many kinds of mobile devices such as mobile phone, MP3 player, PMP (portable multimedia player), notebook, PDA etc. These devices have very limited user interfaces for users to input or output data due to the feature of portability. These mobile devices are usually not used in a fixed place but used while the user is moving with the devices. Also, the size of the mobile device is relatively small.

As such, it is improper to employ general I/O devices in these mobile devices which are devised for fixed devices such as a QWERTY key board, a mouse or a remote control which is devised for a desktop computer, large size TV, etc.

As such, different kinds of user interfaces were devised and widely used for the mobile devices such as a touch pad, a touch screen, a navigation pad, etc.

Nevertheless, the mobile devices are still limited for users to input and output data and users feel it very inconvenient.

Advanced user interfaces for providing users in any environment are required.

SUMMARY OF THE INVENTION

Accordingly, the present invention is directed to a method for controlling a user interface.

An object of the present invention is to provide a user interface controlling method without a touch on an electronic device.

According to the present invention, it is possible to provide an animated user interface which can be employed in various environments.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for controlling a user interface of an electronic device having a display comprising: detecting proximity of an object; detecting a motion pattern of the object; and controlling the user interface according to the detected motion pattern.

In another aspect of the present invention, there is provided a method for controlling a user interface of an electronic device having a touch screen comprising: detecting an object in a space over the touch screen; calculating a position of the object; and controlling the user interface of the electronic device according to the position of the object.

In still another aspect of the present invention, there is provided a method for controlling a user interface of an electronic device having a touch screen comprising: detecting an object in a space over the touch screen; calculating a height from the touch screen to the object; and controlling the user interface of the electronic device according to the height.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the image sensor and a method for manufacturing the same according to the present invention will be described with reference to the accompanying drawings in detail.

Figure 1A:
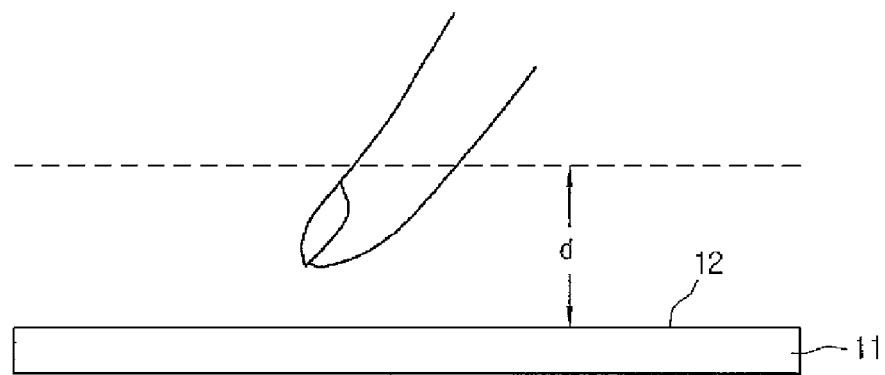
FIGS. 1A through 1C show a proximity sensing system 11 according to an embodiment of the present invention.
Figure 1B:
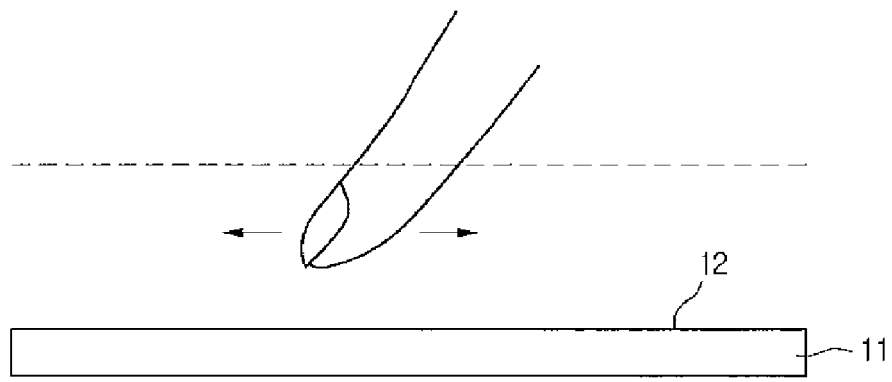
Figure 1C:
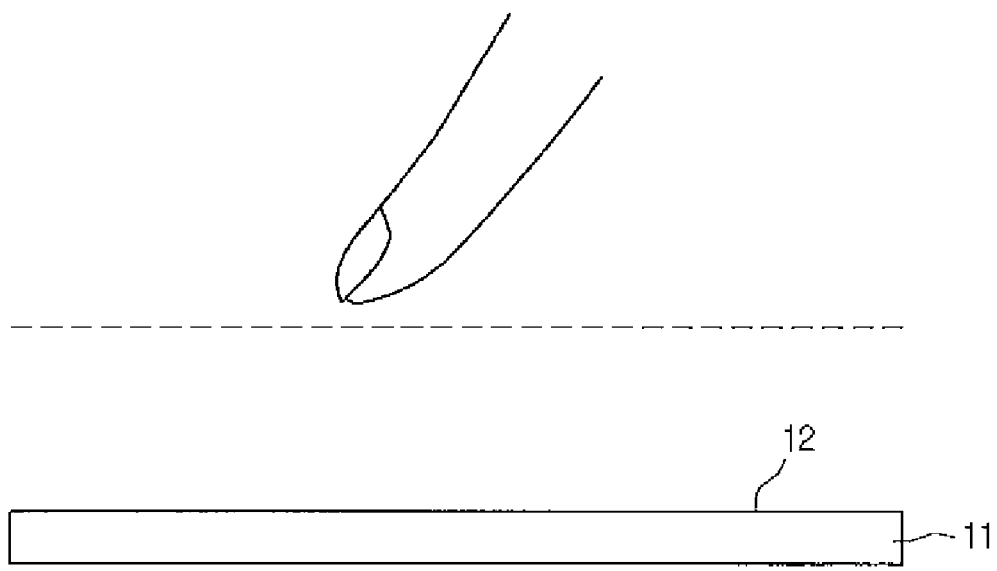

FIGS. 1A through 1C show a proximity sensing system 11 according to an embodiment of the present invention.

As shown in FIG. 1A, the proximity sensing system 11 may detect an approach of an object such as user's finger, a stylus pen when the object approaches within a certain distance, d, for example 1 cm, from the sensing surface 12.

The proximity sensing system 11 may be based on capacitive system, infrared system, or image sensing system.

The capacitive system detects the object by the change of the capacitance. In the capacitive system may comprise a capacitance detection circuit and controller (not shown).

The infrared system emits an infrared and detects infrared reflected by the object. The infrared system may comprise an infrared emitter, an infrared receiver which receives the reflected light, and infrared detection circuit and a controller (not shown).

In the infrared system, a position on the sensing surface 12 as well as the approach of the object may be detected by employing infrared emitter and receiver array near the sensing surface 12. The infrared system is advantageous in that the depth of the sensing field, d, may be extended relatively high.

The image sensing system detects the approach of the object by an image sensor such as a CMOS sensor. The image data obtained by the image sensor may be processed to obtain the proximity or motion of the object. The image sensing system is not limited by the depth of the sensing field and may be set to any value as necessary.

In one embodiment of the present invention, if an object such as user's finger approaches within a sensing field, it may be regarded as if an object is touched on a touch pad or touch screen and a function to the touch may be performed. Hereinafter, the action where the object enters within the sensing field of the proximity sensing system is referred to as a "pickup" action.

When the object is picked up by the proximity sensing system 11, if the user moves the object in parallel to the sensing surface 12, the proximity sensing system 11 may detect the motion pattern just like when user's finger is physically touched and moved, namely dragged on the sensing surface 12.

As such, if the proximity sensing system 11 is mounted on an electronic device having a processor, the processor may recognize the pattern as a direction and perform a specific action.

After a motion pattern is input, if the user takes away the object from the sensing surface, farther than a distance d, the sensing system 11 does not detect the motion of the object any more. Hereinafter the action of taking away from the sensing field is referred to as a "drop" action.

Figure 2A:
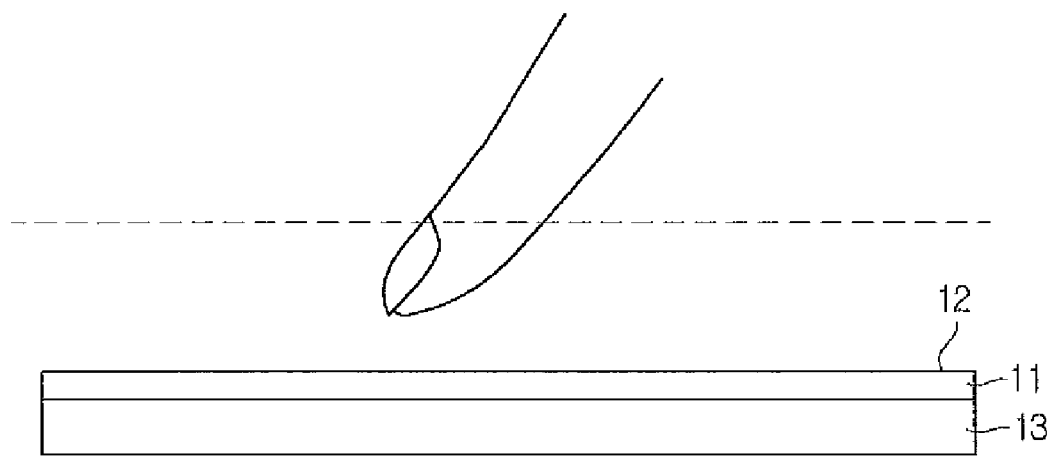
FIGS. 2A through 2C show a method for zooming in or out using gestures according to an embodiment of the present invention.
Figure 2B:
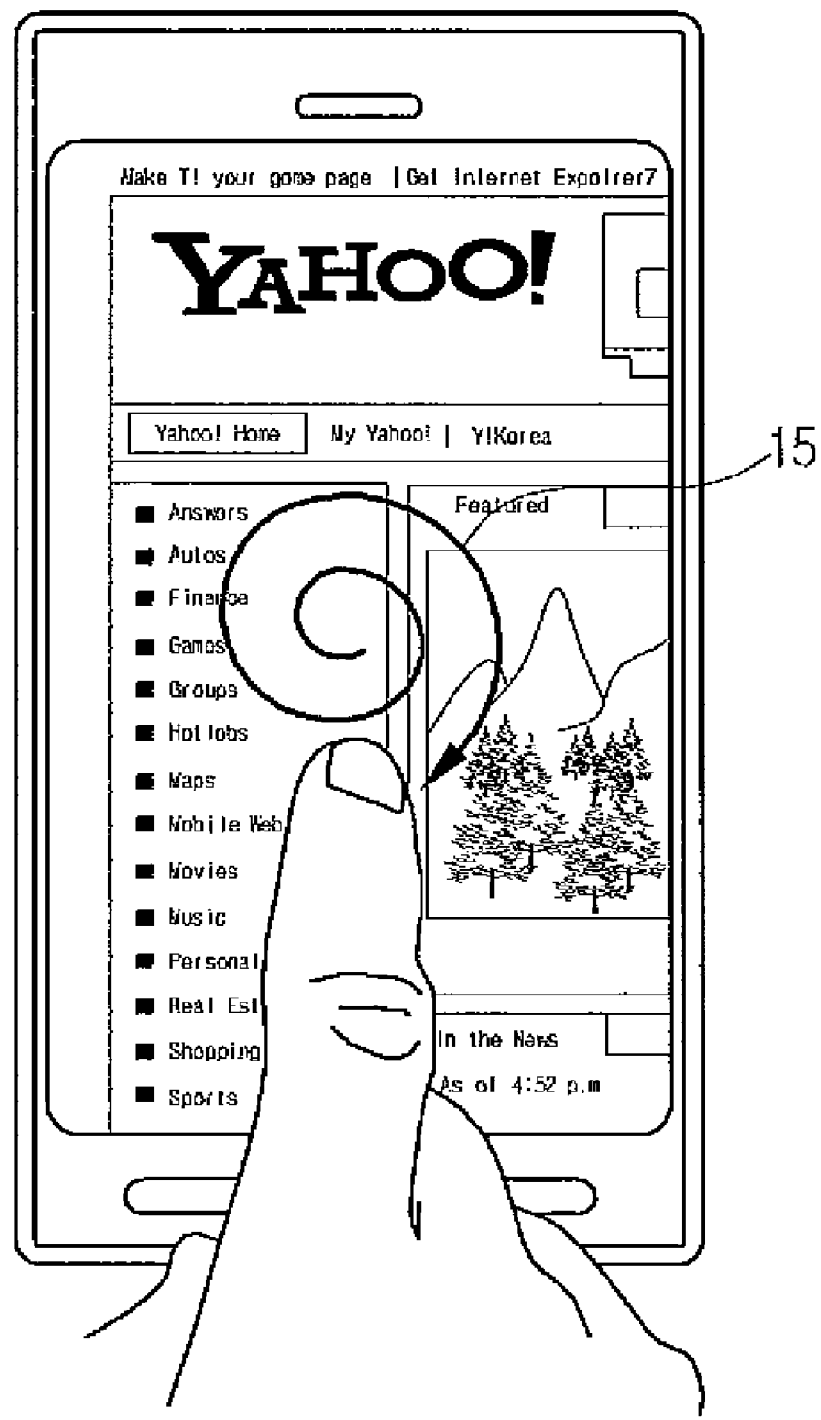
Figure 2C:
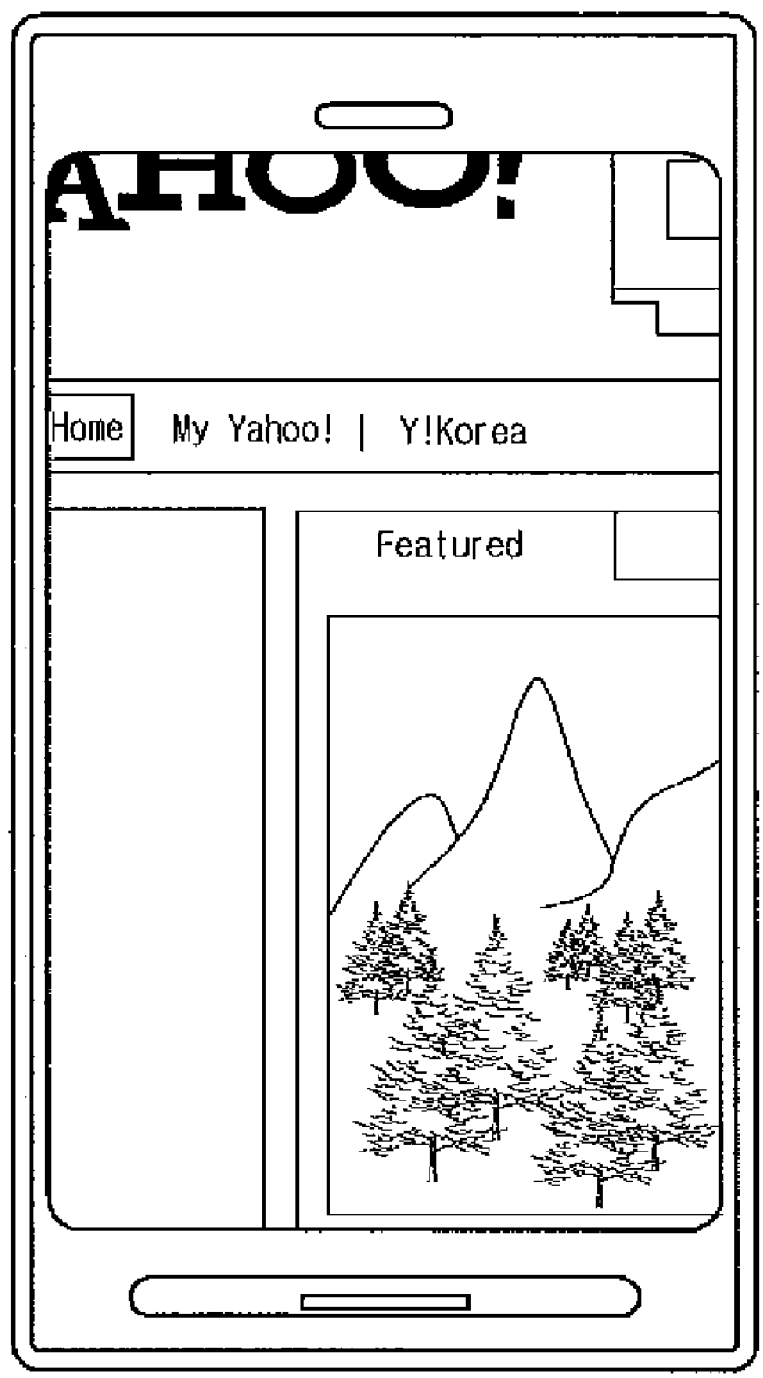

As shown in FIGS. 2A through 2C, the proximity system 11 may be mounted on an electronic device 13 having a display such as a mobile phone. As such, the electronic device 13 may detect a user's gesture in the proximity and perform an action according to the detected gesture.

The electronic device 13 according to the present invention comprises all kinds of electronics devices having a touch screen such as a mobile phone, MP3 player, PMP, notebook, PDA, etc.

In this description, a user interface for a mobile phone which can provide internet browsing function is described as an example of an electronic device.

As shown in FIG. 2A, a proximity sensing system 11 may be mounted on a front surface of an electronic device 13, that is, a surface where a display is mounted. Preferably, the proximity sensing system 11 may cover whole surface of the display on the electronic device 13.

When an object 14 such as a finger or a stylus pen enters the sensing field, the proximity sensing system 11 detects the object, that is, the object is picked up by the proximity sensing system 11.

While being picked up, if the user moves the object to draw a motion pattern, the proximity sensing system 11 may detect and recognize the motion pattern. For example, the user may draw a spiral pattern 15 which is originated from a point on the sensing surface as shown in FIG. 2B.

If the user takes the object out of the sensing field, the object is dropped and the proximity sensing system 11 does not detect the motion pattern any more.

As described above, the proximity sensing system 11 may be based upon one of a capacitive system, infrared detection system, and an image sensor system. By using the proximity sensing system 11, the position of an object may by detected without a touch, and the motion pattern of the object, that is, gesture over the display on which the proximity sensing system is mounted may be detected and recognized.

A controller (not shown) of the electronic device 13 may perform an action according to the detected gesture. For example, if a spiral pattern 15 which is drawn clockwise is detected as shown in FIG. 2B, the display may be zoomed in as shown in FIG. 2C.

The proximity sensing system 11 detects that a circular pattern drawn by the user's finger or a stylus pen gets larger and the controller of the electronic device 13 may recognize a zoom-in direction is inputted from the user by the detected pattern.

In one embodiment, when a spiral pattern is detected, the center point of the display may be moved to the starting point of the spiral pattern together with zooming in the display. That is, if the user draws a spiral pattern which starts from a point of the display, the starting point may become a new center point of the display together with zooming in the display. The moving of the center point of the display may be performed when the object is either picked up or dropped.

In one embodiment, when the user draws a spiral pattern 15, the display may be zoomed in step by step whenever the object turns one circle. That is, whenever the user turns his finger one turns over the proximity sensing system 11, the display may be zoomed in by a certain ratio, for example, 25%. The gradual zoom-in action may be preferably performed when the finger is dropped by the proximity sensing system 11.

Conversely, if the user draws a spiral pattern counterclockwise, the display may be zoomed out. In this case, the circle which the user draws gets smaller, and the starting point of the spiral pattern is in the outer part of the spiral pattern 15, and the ending point is the center point of the spiral pattern. Likewise in the zooming out action, the display may be zoomed out step by step whenever the finger turns one circle.

In the zooming out action, likewise, the proximity sensing system 11 may detect a motion pattern which the user draws. The controller of the electronic device 13 may recognize that a zoom-out direction was inputted from the user by detecting that the radius of the circular patter which the user draws gets smaller and perform the zoom-out action.

Alternatively, it may be distinguished if the spiral pattern is for zooming in or for zooming out by detecting the direction when the spiral pattern is drawn. For example, if the user draws a spiral pattern clockwise, it may be recognized as a pattern for zooming in and if counterclockwise, it may be recognized as a pattern for zooming out and vice versa.

Figure 3A:
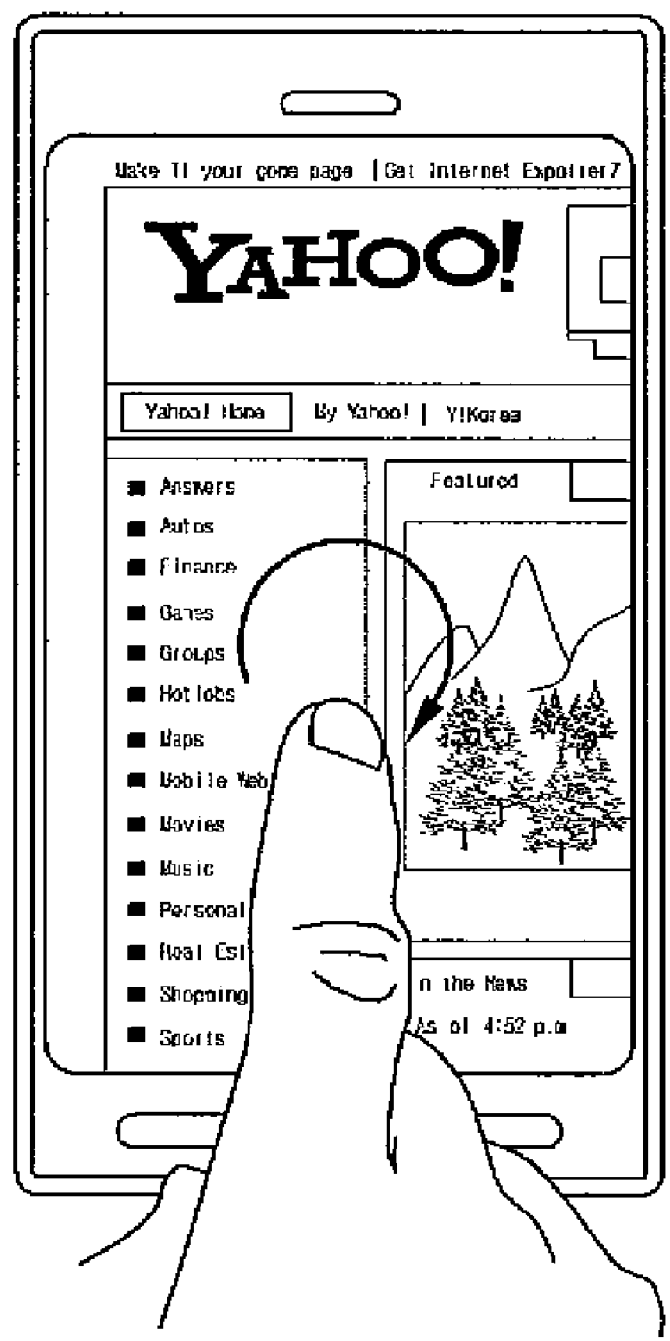
FIGS. 3A and 3B show a method for zooming in or out using gestures according to another embodiment of the present invention.
Figure 3B:
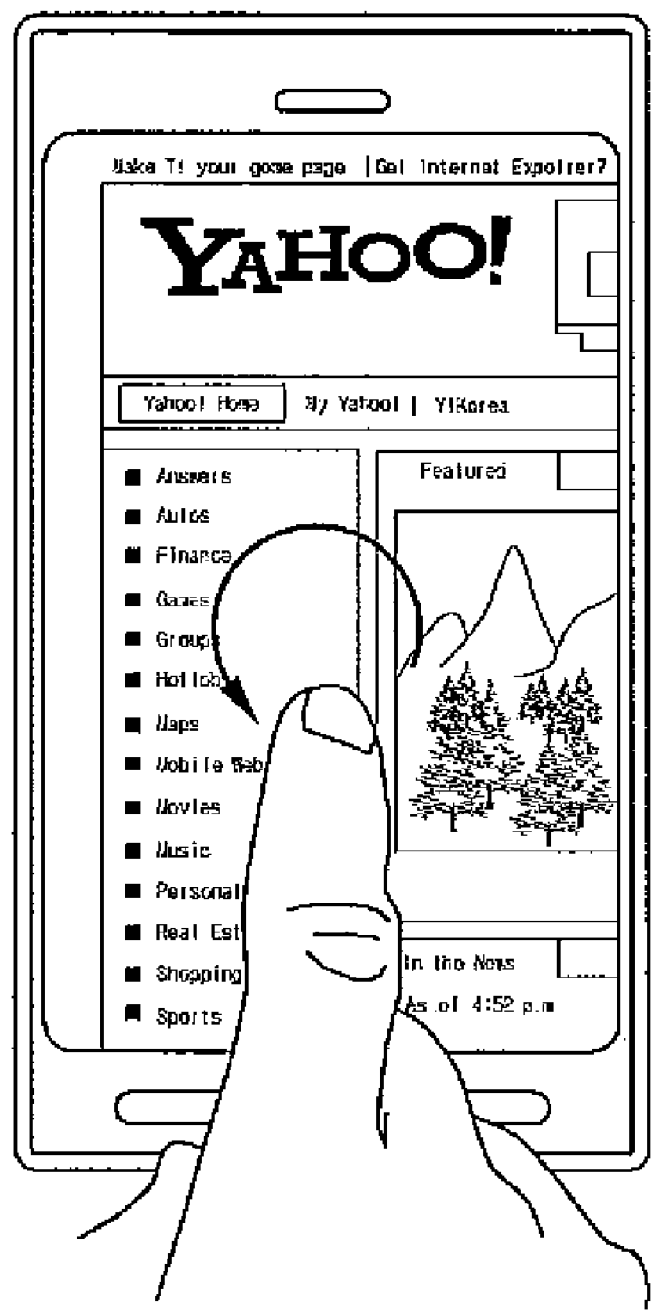
Figure 4:
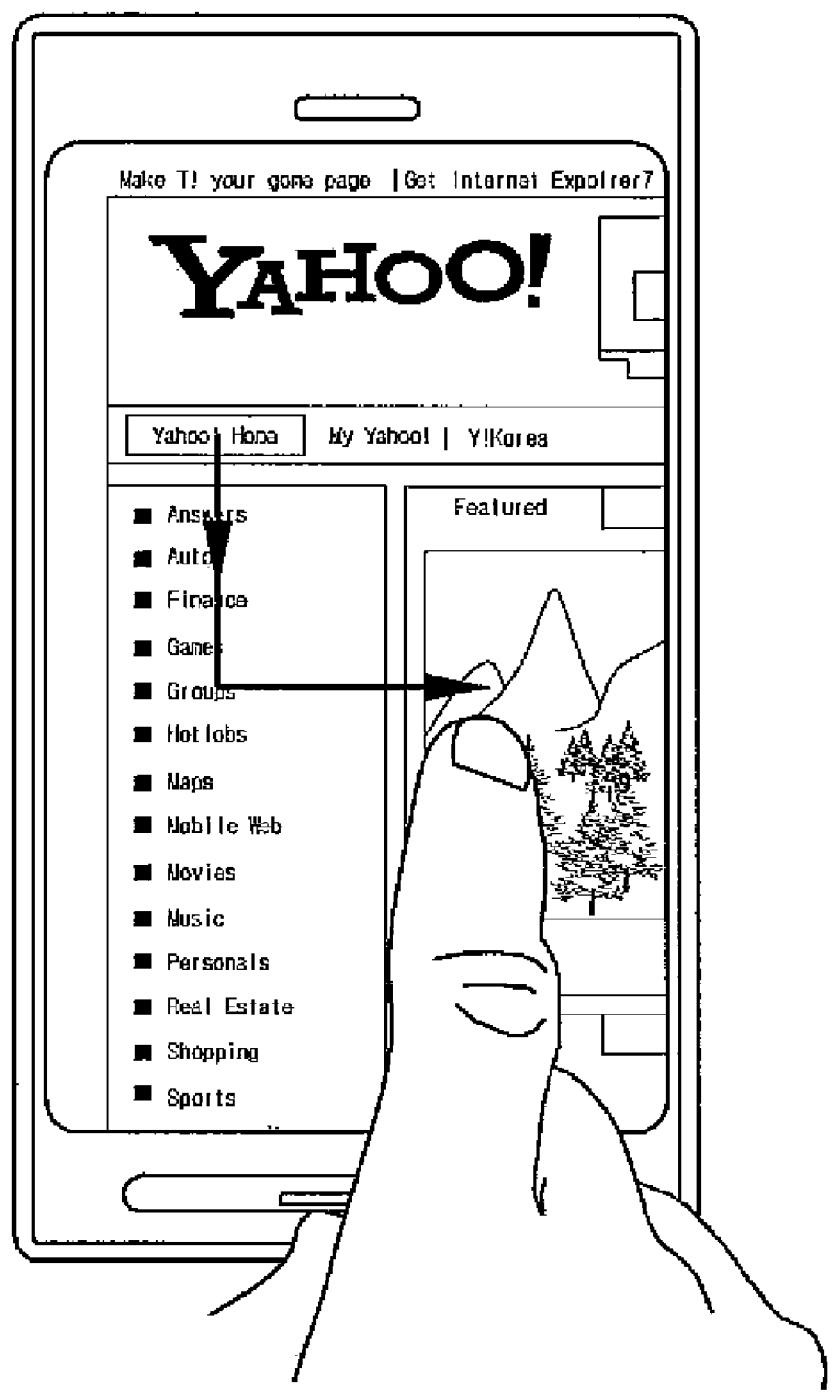
FIGS. 4 through 7B show embodiments of a method for controlling a user interface according to the present invention.

In one embodiment, it may be configured that the display is zoomed in when the user repeatedly draws a circle pattern. In this case, it may be recognized whether it is pattern for zooming in or out from the direction of drawing the circle patterns. For example, the display may be zoomed in by a predetermined percentage whenever the user draws a circle clockwise as shown in FIG. 3A, and zoomed out by a predetermined percentage whenever the user draws a circle clockwise as shown in FIG. 3B.

Various actions may be performed according to the patterns drawn in the proximity of the sensing surface 12 of the proximity sensing system 11. The patterns may comprise characters and numbers.

For example, if the user draws a pattern of "L" in the proximity of the proximity sensing system of an electronic device, the touch screen mounted on the electronic device may be locked. Likewise, if a pattern of "U" is drawn, the touch screen may be unlocked. In this case, if the touch screen is locked, the controller may be configured to ignore any pattern input other than the pattern of "U".

The electronic device 13 may provide multi-functions such as an audio file player, a video file player, and TV receiver. And in each of the multi-functions, the user interface may be controlled by detecting gestures.

Figure 5A:
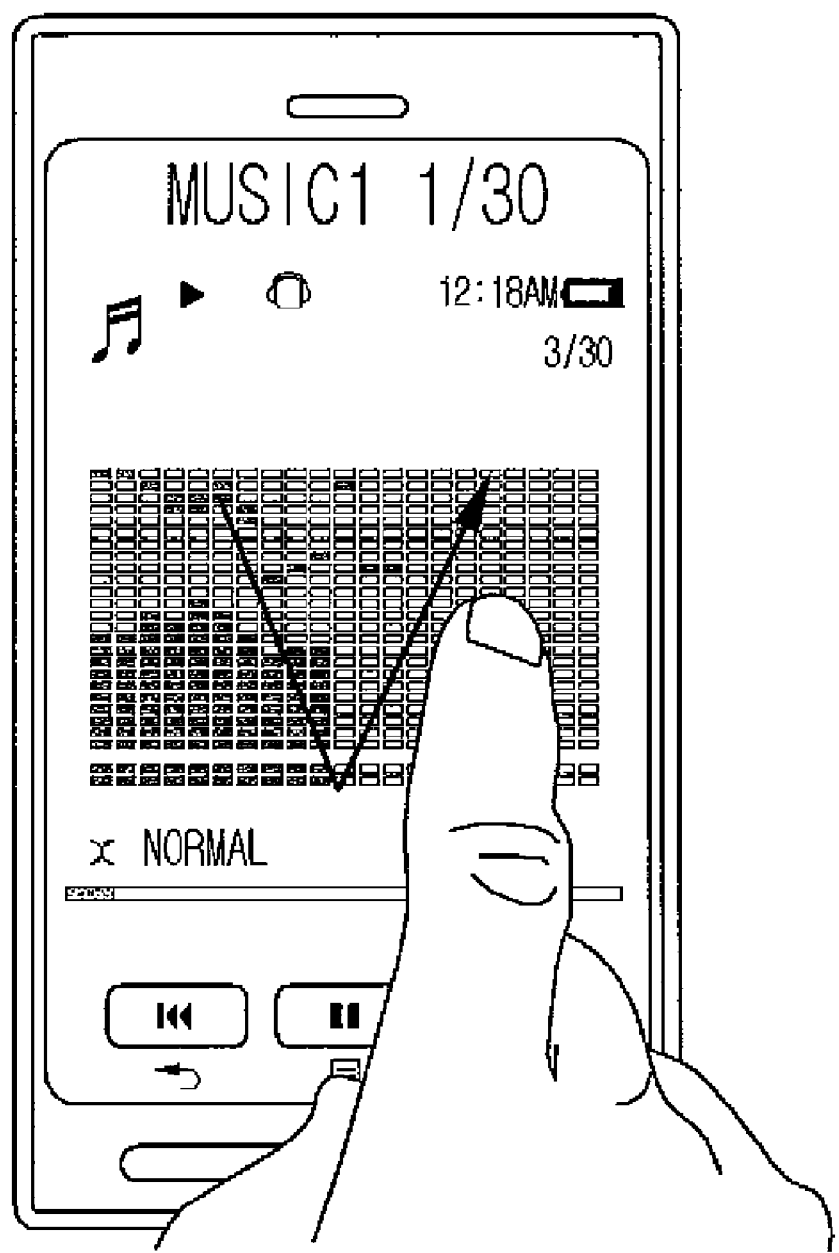
Figure 5B:
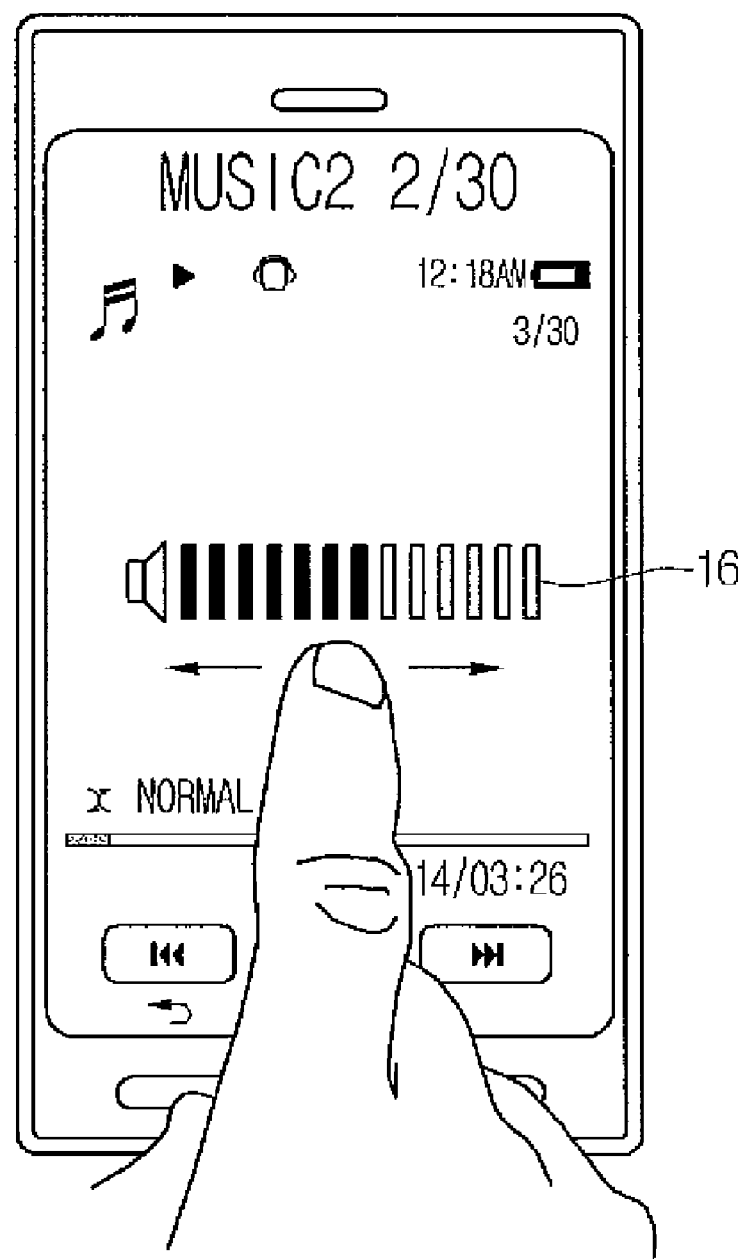

FIG. 5A shows a display where an audio file is being played. In the middle of playing audio file, if a pattern of "V" is detected as shown in FIG. 5A, a virtual volume control panel 16 may be displayed as shown in FIG. 5B. When the volume control panel 15 is displayed, the user may control the volume by touching and dragging the volume control panel 16. Likewise, this control menu may be provided during a video file player mode or TV receiver mode.

Other than the embodiment described above, the patterns which can be detected by the proximity sensing system 11 may be widely varied and the actions to be performed by the detected patterns may be widely varied as well.

It is possible to perform actions by detecting a plurality of characters or numbers. For example, when a string of characters such as "Lo" or "Lock" may be inputted and the actions corresponding to the strings may be performed according to the detected patterns.

It is preferred that the patterns inputted from the user is set as to be intuitively associated with the actions to be performed according to the patterns.

As such, "V" is preferable for volume control. A spiral pattern drawn from inner to outer is preferable for zooming in and a spiral pattern drawn from outer to inner is preferable for zooming out.

In either of the above described embodiments, or the following embodiments, the visual display may be augmented with an audio or tactile (e.g., vibrating) feedback. In one embodiment, a volume of the audio feedback or an intensity of vibrating may vary with the distance of the object over the screen.

Figure 6A:
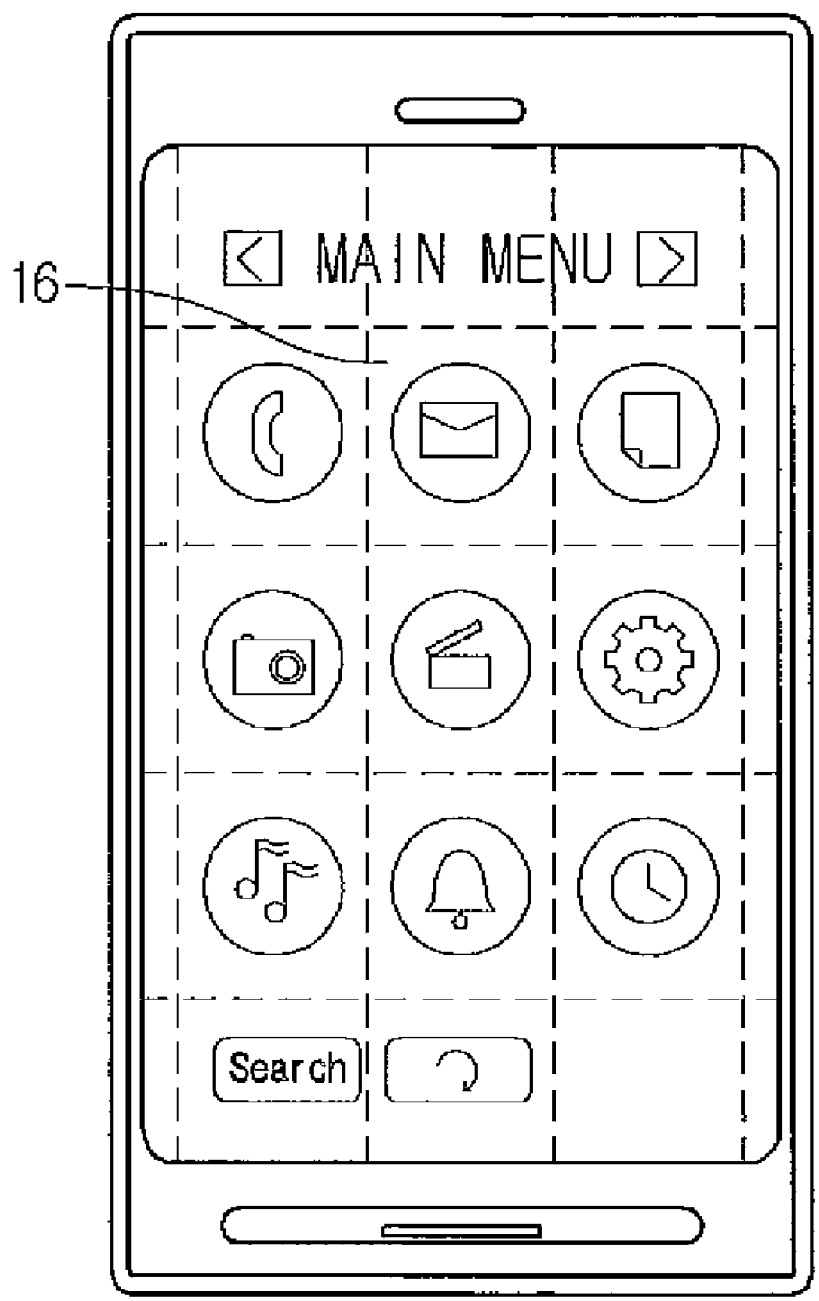
Figure 6B:
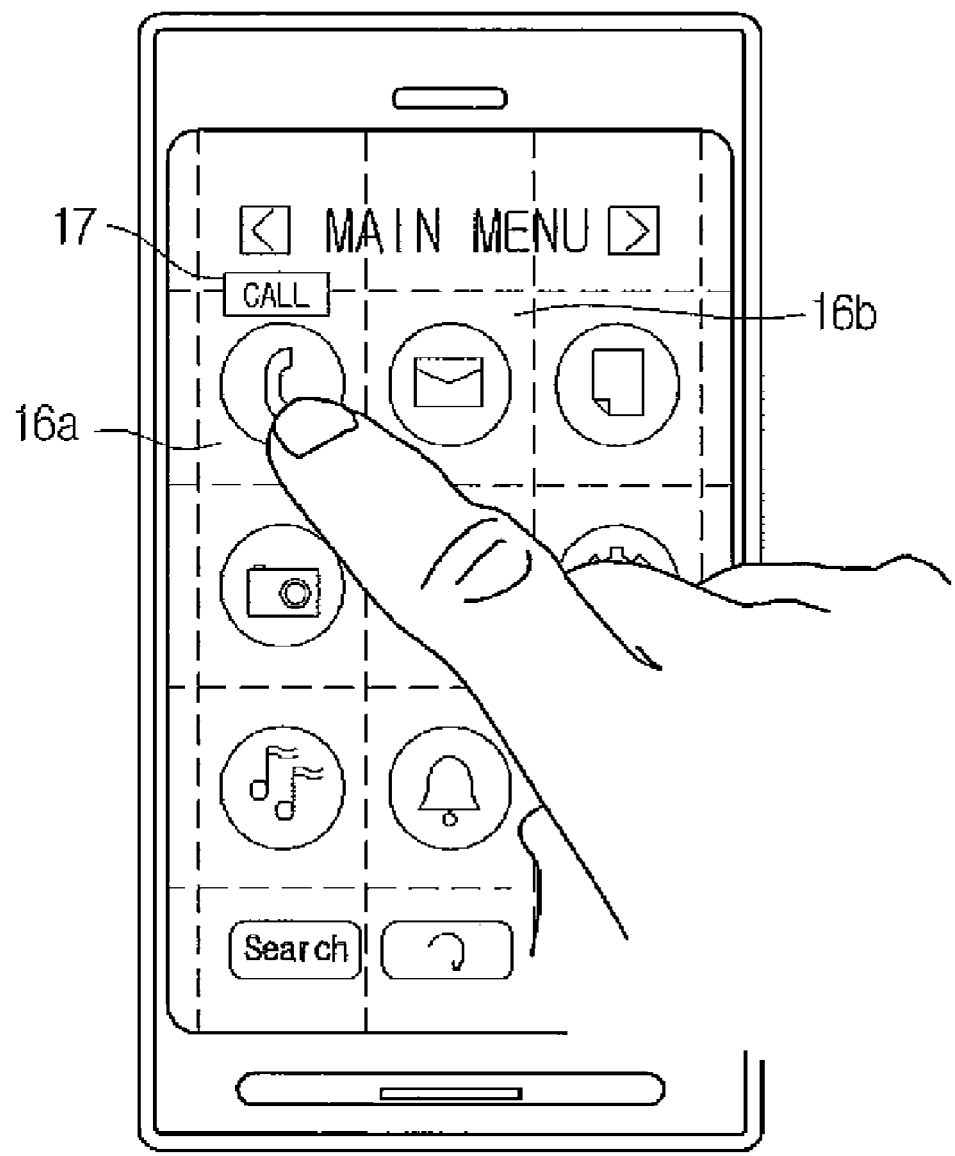

FIGS. 6A and 6B show another embodiment of a method for controlling a user interface using proximity sensing according to the present invention.

FIG. 6A shows so-called a full touch screen phone which does not have physical number buttons and its display covers most of the front side. In the display of the mobile phone of FIG. 6A, displayed is a main menu, which may comprise menus of call, message, directory, alarm/schedule, multimedia, conveniences, sound/vibration, display setting, phone setting etc. Each of menus may be represented by icons.

As shown in FIG. 6A, the display of the mobile phone may be divided into a plurality of sub areas 16.

It may be configured that an action may be performed by touching any part inside each of the sub areas or by touching an icon inside each of sub areas.

As shown in FIG. 6B, if the user approaches his finger to the display of the mobile phone, the proximity sensing system mounted on the mobile phone may detect the approach and the position of approach on the display.

A description for the icon where the finger approached may be displayed as shown in FIG. 6B. That is, if the position of the finger belongs to a sub area 16a which corresponds to a call menu, the description 17a thereof may be displayed and if the position of the finger belongs to a sub area 16b which corresponds to a message menu, the description thereof may be displayed.

The user may use each of the functions by touching each icon with his finger or stylus pen. It might happen that it is ambiguous which icon the user tries to select if the user uses his finger or something thick to touch the icon.

Figure 6C:
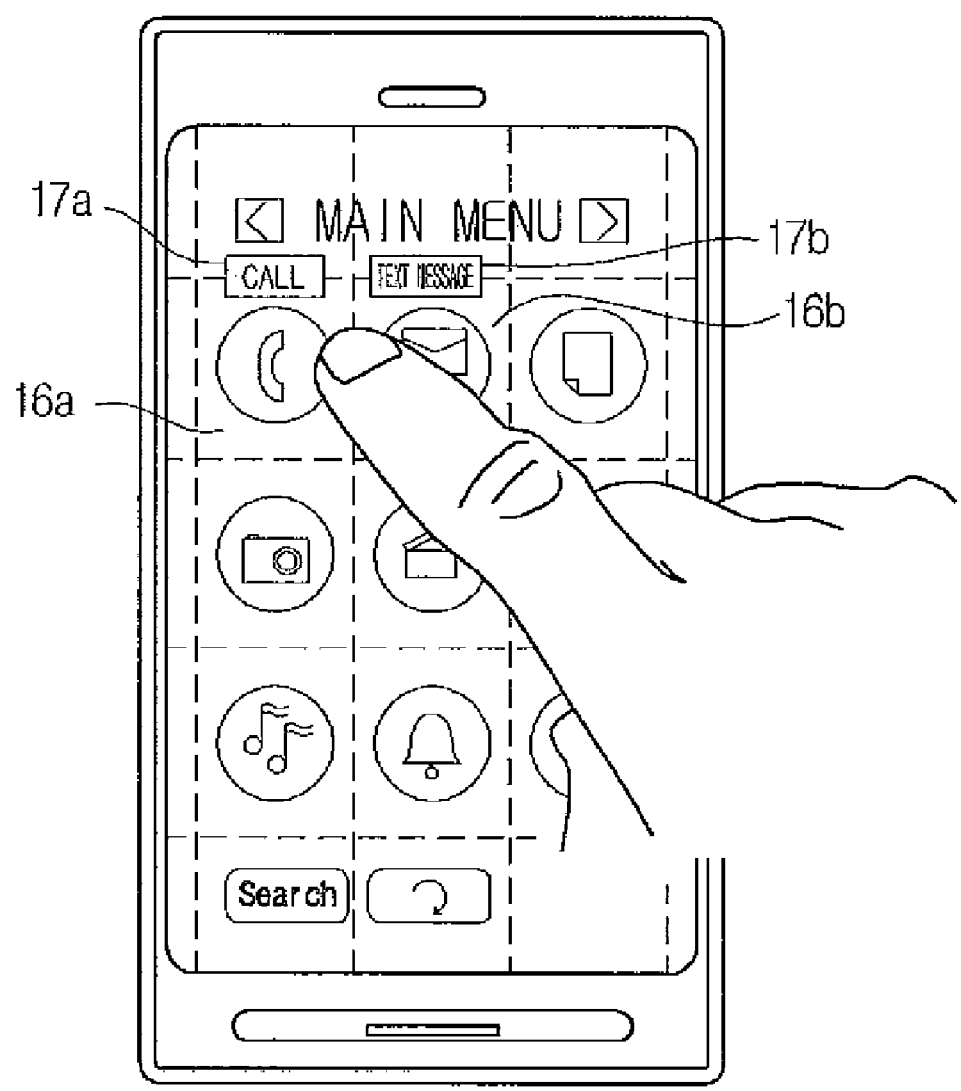

That is, as shown in FIG. 6C, if user's finger or object is positioned between the sub areas, it is ambiguous which icon is to be performed. In FIG. 6C, it is ambiguous which icon is to be performed, call menu 16a or message menu 16b and none of the icon may be selected or a plurality of the icons may be selected and performed at the same time.

In this case, the descriptions for both sub areas 16a, 16b may be displayed at the same time to guide the user to recognize where this finger is located. By the description displayed, the user may move to a sub area which the user wants to perform.

In another embodiment, the user may change the orientation of an image or a motion picture being displayed.

Figure 7A:
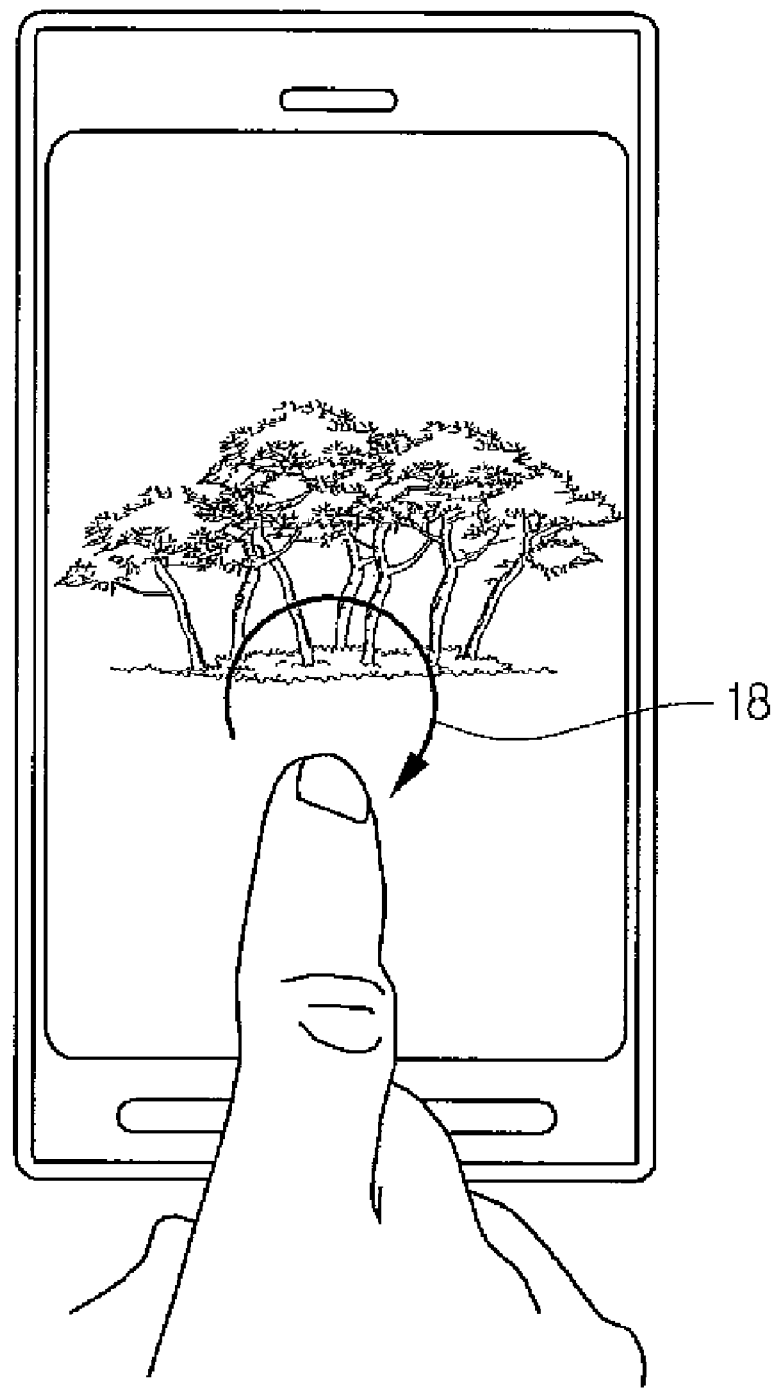
Figure 7B:
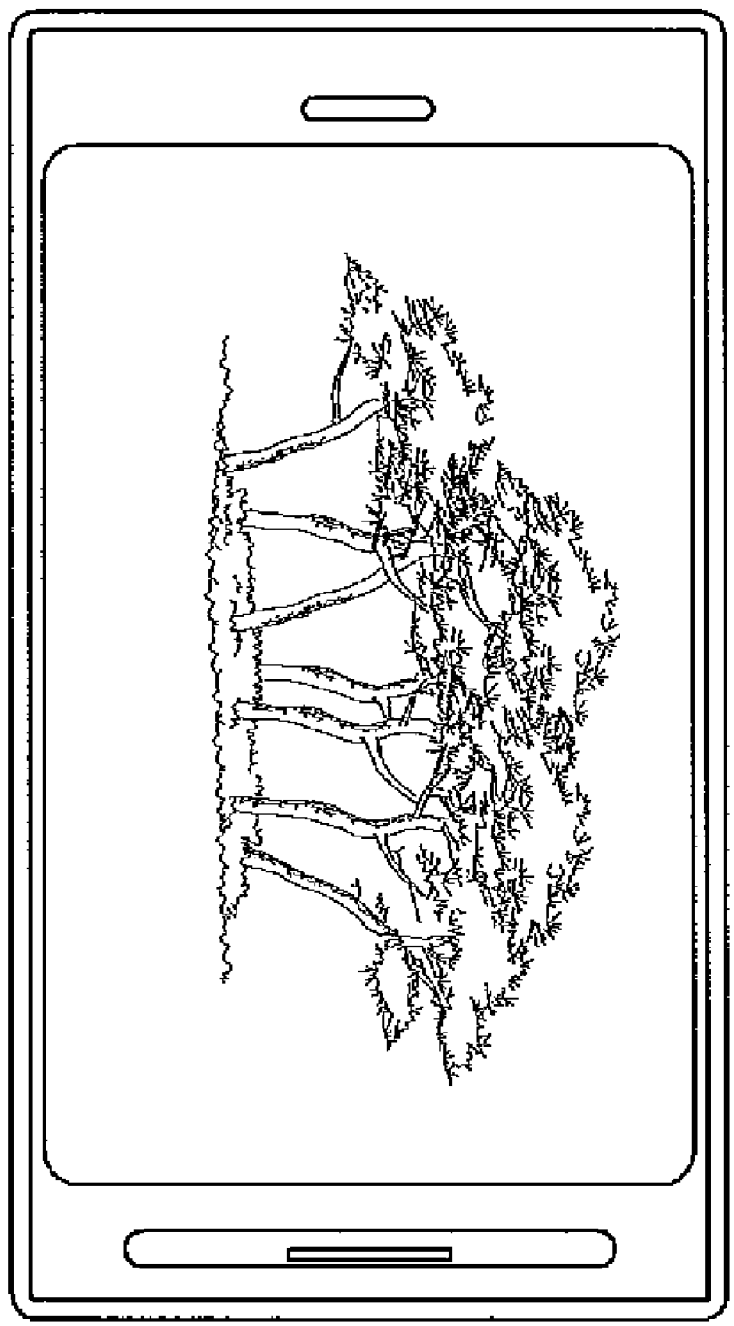

As shown in FIG. 7A, where an image is displayed in a portrait type, if the user draws a turning pattern in the proximity of the proximity sensing system 11, the image may be displayed in a landscape type in response to the turning pattern as shown in FIG. 7B.

The above description may be applied to other embodiments where a video file is played on the electronic device, or the internet web page is browsed by the electronic device as well as other operation modes of the electronic device.

Figure 8A:
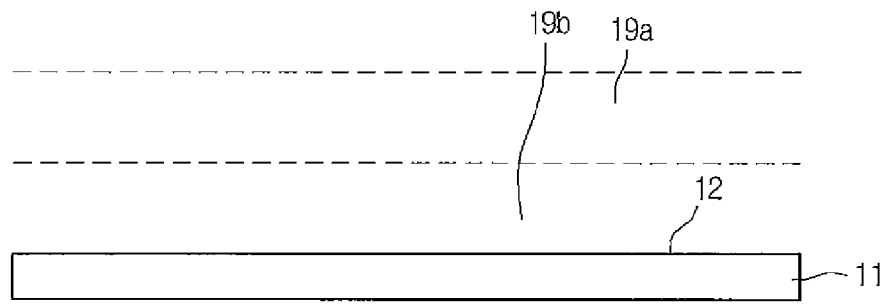
FIGS. 8A through 8C show a proximity sensing system according to another embodiment of the present invention.
Figure 8B:
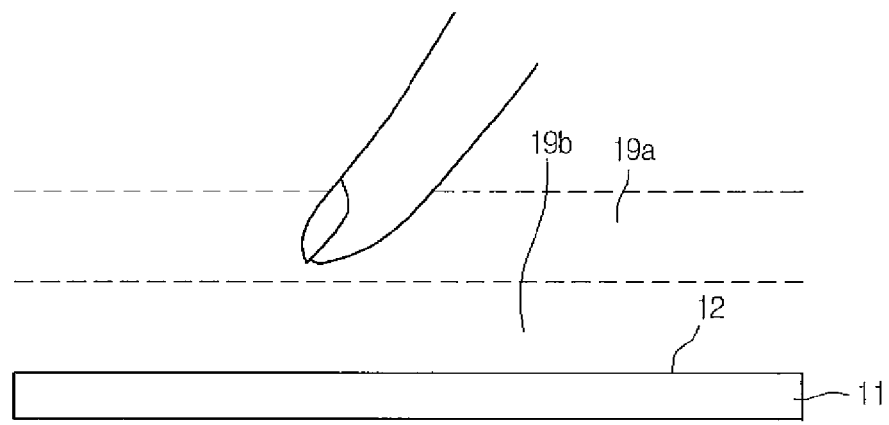
Figure 8C:
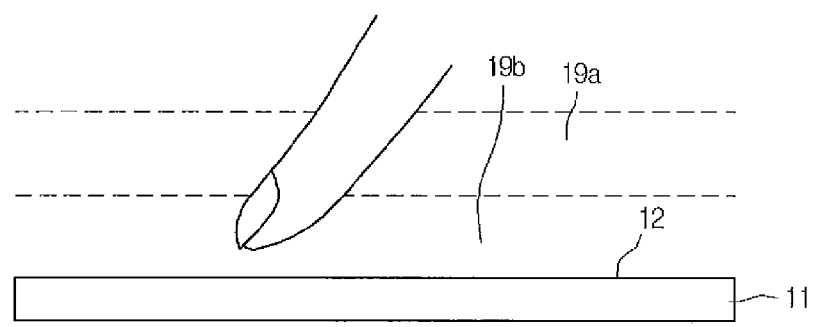

FIGS. 8A through 8C show an embodiment of a method for controlling a user interface using proximity sensing according to the present invention.

If the proximity sensing system 11 is capacitive type, the larger the capacitance variation gets, the closer the objects such as a finger approach. As such, it is possible calculate the distance or height from the sensing surface to the object according to the capacitance variation. The field over the sensing surface 12 of the proximity sensing system 11 may be divided into a plurality of sections and it is possible to determine how closely the object approached to the sensing surface 12.

In case that the proximity sensing system 11 is infrared type, it is possible to calculate the height from the sensing surface to the object by measuring the reflection angle of the infrared reflected by the object. If the proximity sensing system 11 is image sensor type, the height from the sensing surface to the object may be calculated through image processing of the object.

The sensing field of the proximity sensing system 11 may be divided into the first field 19a and the second field 19b according to the distance from the sensing surface 12. If the object is beyond the first field 19a, it is determined that there is no input.

The object may be in the first field 19a or in the second field 19b to make an input to the electronic device on which the proximity sensing system is mounted. Or the object may be in touch with the proximity sensing system. Different actions may be performed depending on what field the object is in.

For example, assume the proximity sensing system 11 is mounted a mobile phone, if the user draws a pattern as shown in FIG. 2b in the first field 19a with his finger, the display may be zoomed in by 25%, and if in the second field 19b, the display may be zoomed in by 50%. If the pattern is drawn with the finger in touch with the touch screen, another action could be performed.

In one embodiment, the display may be zoomed in by a predetermined percentage if the user's finger moves from the first field 19a to the second field 19b and zoomed out if the user' finger moves conversely.

In another embodiment, an icon over which the user's finger is positioned may be enlarged if the finger is in the first field 19a, and may be performed if the finger enters the second field.

In still another embodiment, assume the electronic device is in a image viewer mode, where the preview images of all the image files, if the finger is in the first field 19a, the preview over which the finger is positioned may be enlarged a little to show that the preview is to be selected, and the image may be enlarged to the full size if the finger enters the second field 19b.

In one embodiment, the variations of the height of the object may be measured for a while and actions may be performed according to the variation of the height. For example, if user's finger comes and goes between the first field 19a and the second field 19b several times, the volume may be turned up or down or the display may be zoomed in or out by an amount in proportion to the number of coming and going.

In one embodiment, feedback such as sound or tactile feedback may be provided in response to motion pattern detected. And the intensity of the feedback may be varied according to the height of the object.

For example, if an object enters the first field 19a, a weak feedback may be provided and if an object enters the second field 19b a strong feedback may be provided. As such, the user may be provided with an animated user interface.

Other functions include display control functions such as a zoom function, a rotate function, an aperture open function, a dissolve function, and a reveal function. Other functions include a screen activate function. That is, when the object/finger is above a threshold distance, menu icons are inactive. When the object/finger is detected above a particular menu icon and below the threshold distance, the menu icon will activate, revealing sub menu icons or control functions relative to the menu icon.

Figure 9A:
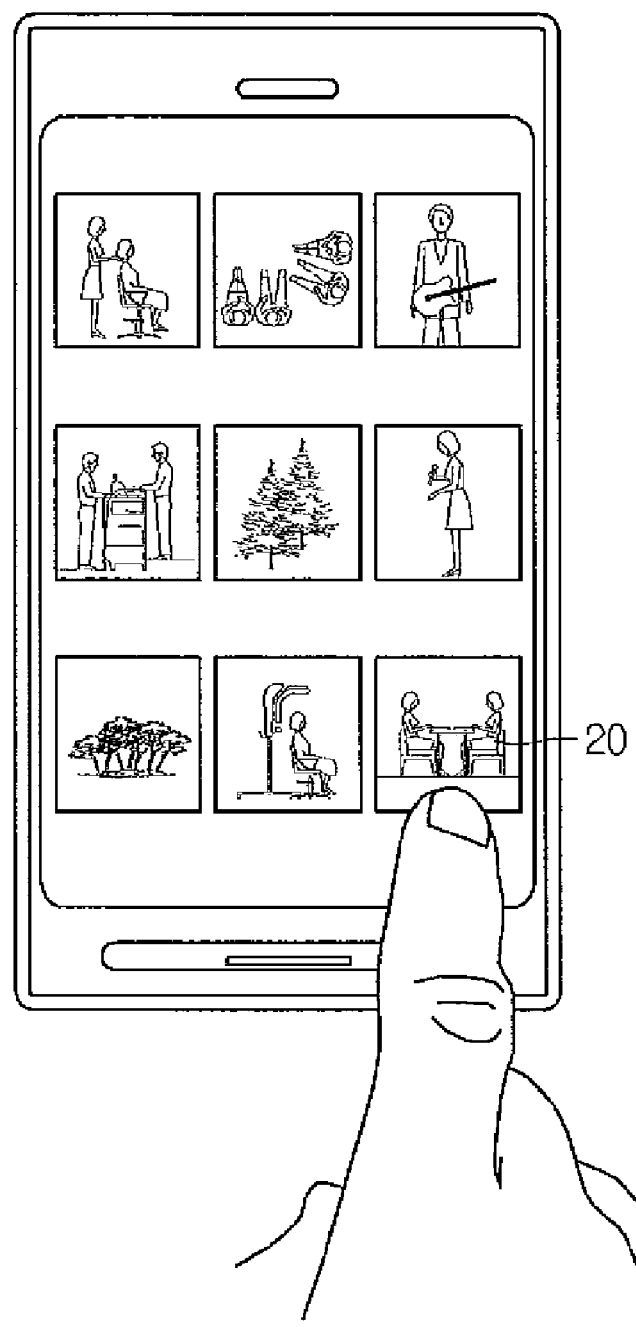
FIGS. 9A and 9B show a method for controlling a user interface according to an embodiment of the present invention.
Figure 9B:
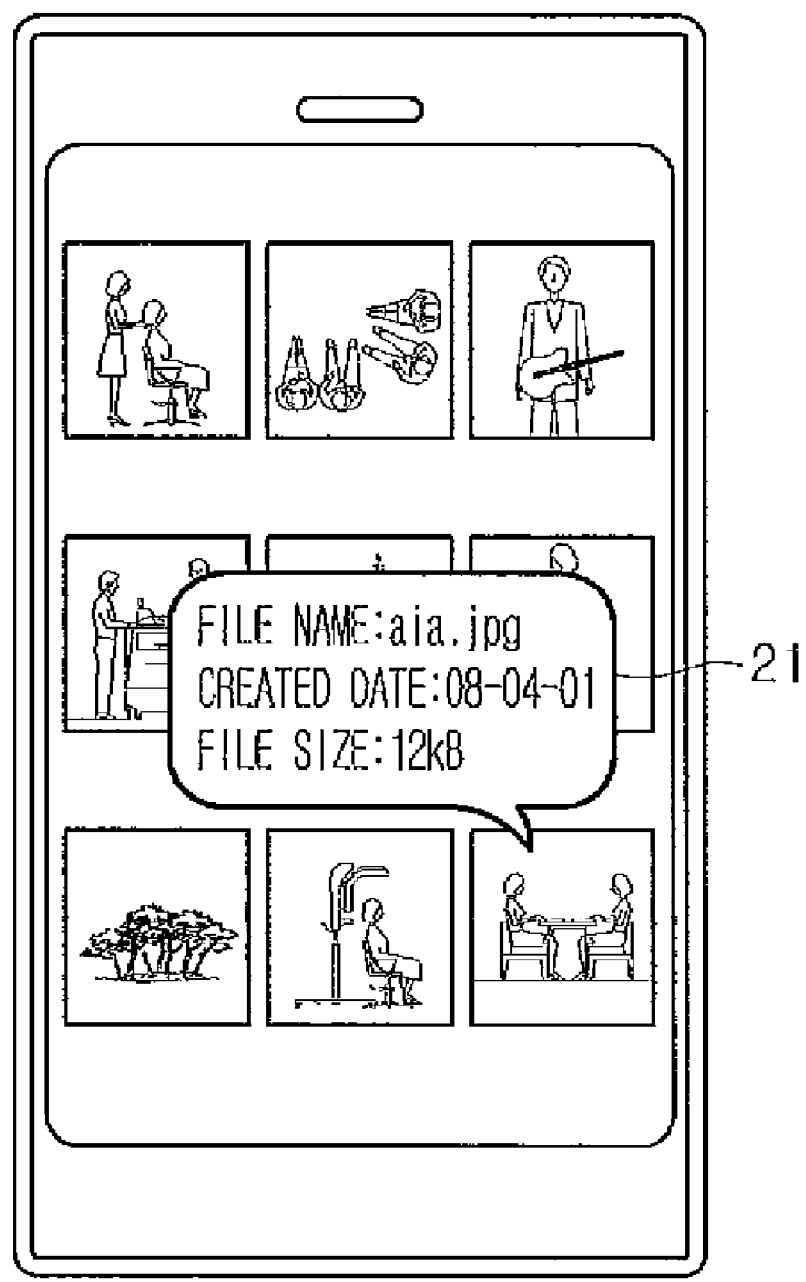

FIGS. 9A and 9B show another embodiment of a method for controlling a user interface using proximity sensing according to the present invention.

FIG. 9A shows a full touch screen phone which provides for an image viewer mode. Icons 20 which comprise previews for a plurality of images are displayed. If the user touches or double touches one of the icons 20, the image is displayed in a full size.

If the user approaches his finger to the surface of the display, that is, the sensing surface without a touch, a description for the corresponding image may be displayed as shown in FIG. 9B. The description may comprise file name, file size, resolution of the image, etc.

Figure 10:
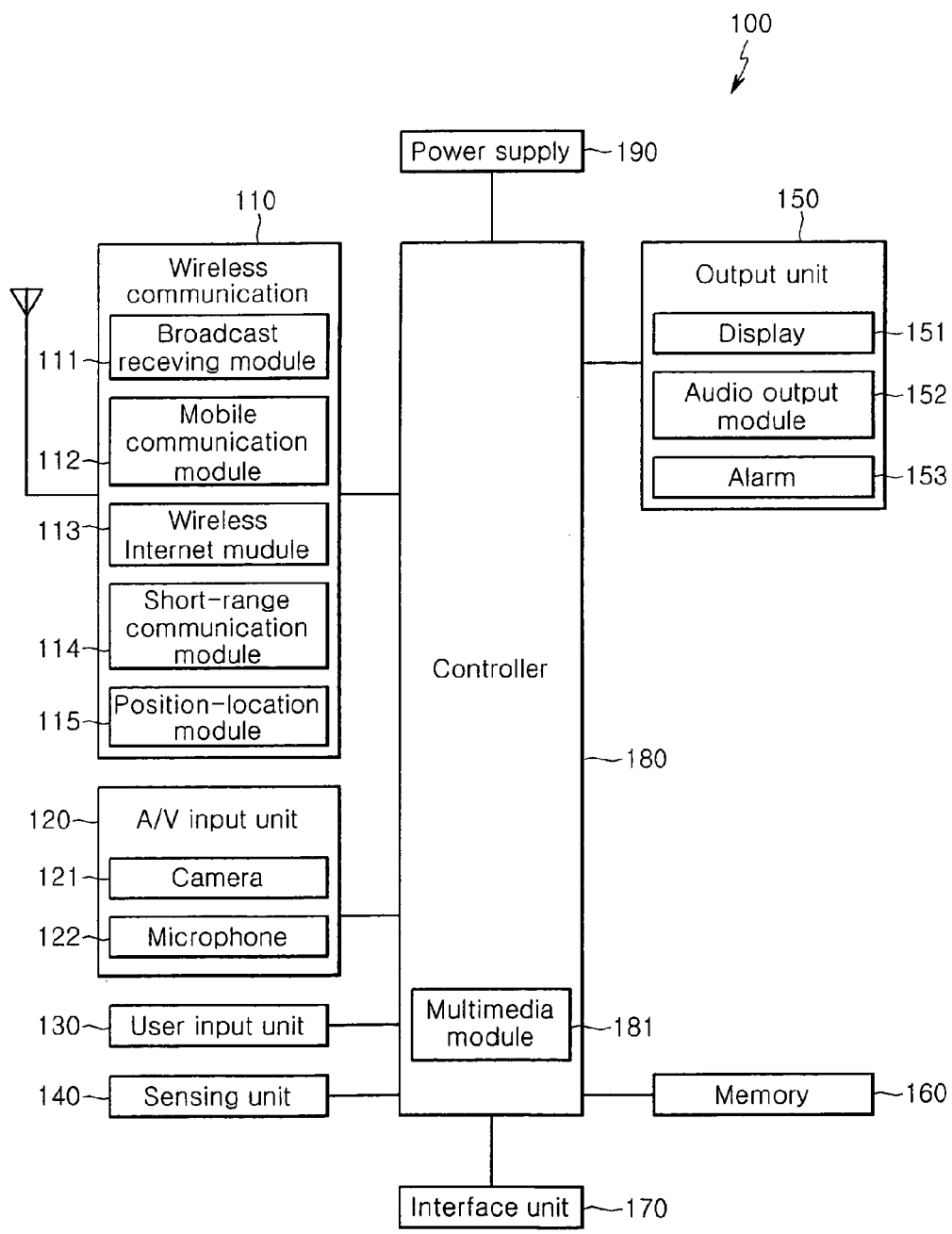
FIG. 10 is a block diagram of a mobile device in accordance with an embodiment of the present invention.

FIG. 10 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may farther include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 10 further shows output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism.

It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 10 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile device 100 of FIG. 10 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 11:
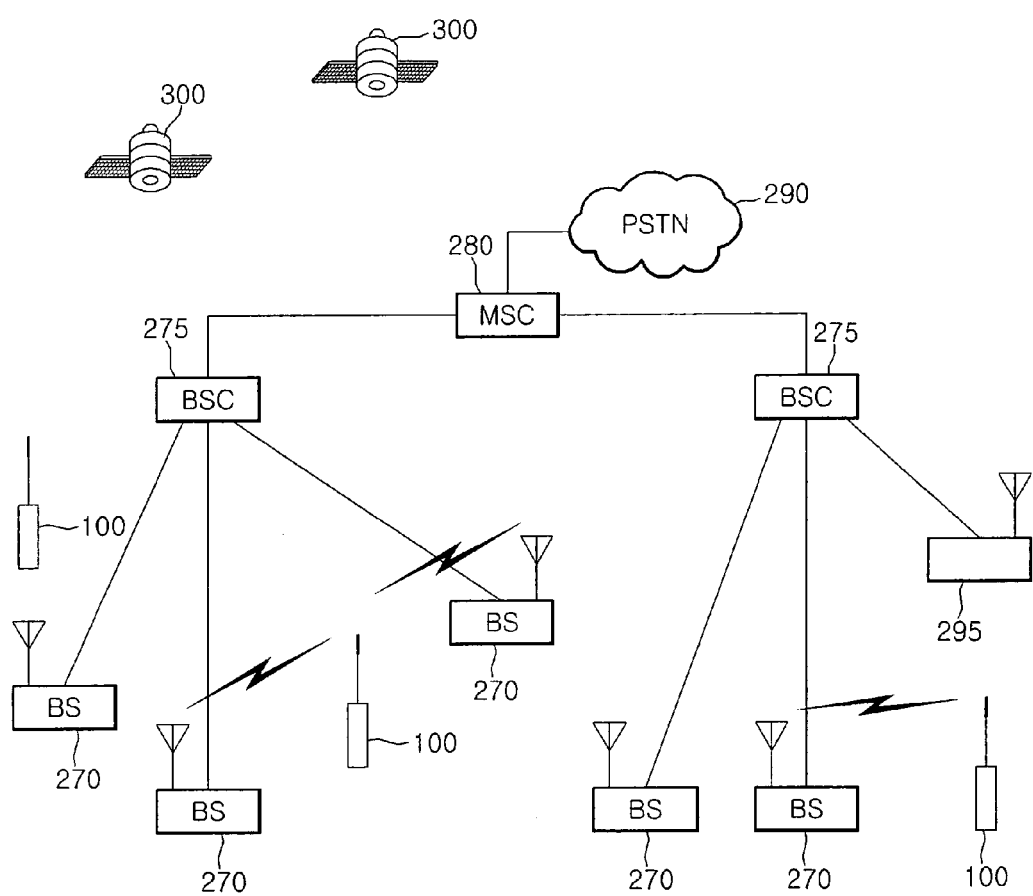
FIG. 11 is a block diagram of a CDMA wireless communication system operable with the mobile device of FIG. 10.

Referring now to FIG. 11, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable devices 100 operating within the system. The broadcast receiving module 111 (FIG. 10) of the portable device is typically configured to receive broadcast signals transmitted by the DMB transmitter 295. Similar arrangements may be implemented for other types of broadcast and multicast signaling (as discussed above).

FIG. 11 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 10) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

The above embodiment may be applied to various electronic devices having proximity sensing system. When several files are listed or icons for the files are represented on the display, if the user approaches an object without a touch, information for the file may be provided so that the user can get brief information for the file.

In the foregoing descriptions, embodiments for a mobile phone were described, but the present invention may be applied to various kinds of electronic devices which have proximity sensor.

Further, the present invention may be implemented by using infrared type system or image sensing type system as well as capacitive type system.

What is claimed is:

1. A method for controlling a user interface of an electronic device having a display comprising:
   detecting a proximity of an object to the display;
   detecting a two-dimensional motion pattern of the object; and
   controlling the user interface according to the detected two-dimensional motion pattern,
   wherein the two-dimensional motion pattern comprises a spiral, and the step of controlling includes zooming the user interface in or out based on a direction of the spiral, and
   wherein the user interface is incrementally zoomed in or out by a certain ratio whenever the object turns one circle of the spiral.

2. The method according to claim 1, wherein
   the two-dimensional motion pattern further comprises a circle pattern and
   the step of controlling further includes rotating the user interface based on a direction of the circle pattern.

3. The method according to claim 1, wherein
   the two-dimensional motion pattern further comprises one of an alphabet character, a number and a symbol, and
   the step of controlling the user interface further comprises one of:
   controlling a volume control menu, and
   locking or unlocking the user interface.

4. A method for controlling a user interface of an electronic device having a touch screen divided into a plurality of touch-sensitive zones, comprising:
   detecting an object in a space over a border between a first and second zone of the plurality of touch-sensitive zones and outputting a corresponding detection signal, wherein the plurality of touch-sensitive zones are corresponding to a plurality of icons displayed on the touch screen respectively;
   simultaneously displaying first and second information elements, different than the plurality of icons, explaining the first and second zones in response to the detection signal;
   detecting movement of the object away from the border and to a space over the first zone; and
   displaying the first information element while not displaying the second information element.

5. A portable device, comprising:
   a display;
   a proximity sensor configured to detect a proximity of an object over the display, to detect a two-dimensional motion pattern of the object, and to output corresponding proximity and motion signals; and a processor configured to control a user interface displayed on the display based on the proximity and motion signals, wherein the two-dimensional motion pattern comprises a spiral, and the processor is configured to zoom the user interface in or out based on a direction of the spiral, and wherein the user interface is incrementally zoomed in or out by a certain ratio whenever the object turns one circle of the spiral.

6. A portable device, comprising:

a display having a touch screen divided into a plurality of touch-sensitive zones;

a proximity sensor configured to detect an object in a space over a border between a first and second zone of the plurality of touch-sensitive zones and to output a corresponding sensor signal, wherein the plurality of touch-sensitive zones are corresponding to a plurality of icons displayed on the touch screen respectively; and a processor configured to control the display to simultaneously display first and second information elements, different than the plurality of icons, explaining the first and second zones, respectively, in response to the sensor signal, wherein the processor displays the first information element while not displaying the second information element when the proximity sensor detects movement of the object away from the border and to a space over the first zone.

* * * * *